(12) United States Patent
Bapat

(10) Patent No.: US 10,339,189 B2
(45) Date of Patent: Jul. 2, 2019

(54) IDENTIFICATION OF PEOPLE IN COMMON

(71) Applicant: Google LLC, Mountain View, CA (US)

(72) Inventor: Shashank Ashok Bapat, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/834,327

(22) Filed: Aug. 24, 2015

(65) Prior Publication Data

US 2018/0234427 A1 Aug. 16, 2018

Related U.S. Application Data

(60) Provisional application No. 62/095,695, filed on Dec. 22, 2014.

(51) Int. Cl.
G06F 16/9535 (2019.01)
H04L 29/06 (2006.01)
H04W 4/08 (2009.01)
H04W 12/02 (2009.01)
H04W 12/08 (2009.01)
H04W 4/21 (2018.01)

(52) U.S. Cl.
CPC ...... G06F 16/9535 (2019.01); H04L 63/0421 (2013.01); H04L 63/105 (2013.01); H04W 4/08 (2013.01); H04W 4/21 (2018.02); H04W 12/02 (2013.01); H04W 12/08 (2013.01)

(58) Field of Classification Search
CPC .............. H04L 63/102; H04L 65/403; G06F 17/30867
See application file for complete search history.

(56) References Cited

U.S. PATENT DOCUMENTS 8,631,068 B1 * 1/2014 Jannink ............... G06F 16/1834
709/204
2009/0031030 A1 * 1/2009 Schmidt ................ G06Q 10/00
709/227

(Continued)

OTHER PUBLICATIONS

Sun et al., Privacy Preserving Social Network Publication Against Mutual Friend, IEEE 13th International Conference on Data Mining Workshops, 2013 (Year: 2013).*

(Continued)

Primary Examiner — Luu T Pham
Assistant Examiner — Harvey I Cohen
(74) Attorney, Agent, or Firm — Fish & Richardson P.C.

(57) ABSTRACT

A method for identifying people in common (PIC) between two users on a social networking service includes: receiving a request for a set of people in common between a first user and a second user on a social networking service, determining publicly visible connections of the first user and the second user from the social networking service; determining connections visible only to members of an accessible group of the first user and the second user from the social networking service, access to the connections visible only to members of the accessible group being controlled by security permissions; determining a set of people in common between the first user and the second user using the publicly visible connections, the connections and using security permissions from a perspective of the first user; and providing the set of people in common to the first user.

18 Claims, 10 Drawing Sheets

(56) References Cited

U.S. PATENT DOCUMENTS

| | | | | |
|---|---|---|---|---|
| 2012/0096002 A1* | 4/2012 | Sheehan | ............... | G06Q 10/10 |
| | | | | 707/737 |
| 2012/0284336 A1* | 11/2012 | Schmidt | ................. | H04W 4/21 |
| | | | | 709/204 |
| 2013/0007126 A1* | 1/2013 | Ziemann | ............... | G06Q 50/01 |
| | | | | 709/204 |
| 2013/0212173 A1* | 8/2013 | Carthcart | .............. | G06Q 50/01 |
| | | | | 709/204 |
| 2013/0254213 A1* | 9/2013 | Cheng | ................... | G06Q 50/01 |
| | | | | 707/748 |
| 2014/0032659 A1* | 1/2014 | Marini | ................... | H04L 51/32 |
| | | | | 709/204 |
| 2014/0059130 A1* | 2/2014 | Sheinfeld | ............. | H04L 65/403 |
| | | | | 709/204 |
| 2014/0317189 A1* | 10/2014 | Pedraza | ............... | H04L 67/306 |
| | | | | 709/204 |

OTHER PUBLICATIONS

Nia et al., LeveragingSocialInteractionsToSuggestFriends, IEEE 33rd International Conference on Distributed Computing Systems Workshops, 2013 (Year: 2013).*

* cited by examiner 220        222                                              224
 ↙          ↘                                                ↙
User B •——— Visible to "Works" and "Engineering" groups ———▶ User C

Figure 2B

230
  ↘  Works      Engineering    Skate Buddies    Public
    (User A)    User I         User L           User T
     User D     User J         User M           User U
     User E     User K         User N           User V
     User F                    User O           User W
     User G                    User P           User X
     User H                    User Q           User Y
                               User R           User Z
                               User S           ...

Figure 2C

| Works | Engineering 230 | Skate Buddies | Public |
|---|---|---|---|
| User D | (User A) | User L | User T |
| User E | User I | User M | User U |
| User F | User J | User N | User V |
| User G | User K | User O | User W |
| User H | | User P | User X |
| | | User Q | User Y |
| | | User R | User Z |
| | | User S | ... |

Figure 2D

| Works | Engineering | 230 Skate Buddies | Public |
|---|---|---|---|
| User D | User I | (User A) | User T |
| User E | User J | User L | User U |
| User F | User K | User M | User V |
| User G | | User N | User W |
| User H | | User O | User X |
| | | User P | User Y |
| | | User Q | User Z |
| | | User R | ... |
| | | User S | |

Figure 2E

IDENTIFICATION OF PEOPLE IN COMMON

CROSS REFERENCE TO RELATED APPLICATIONS

This application claims priority under 35 USC §. 119(e) to U.S. Application No. 62/095,695, entitled "Identification of People in Common" filed Dec. 22, 2014, the entirety of which is herein incorporated by reference.

BACKGROUND

The disclosure relates to identifying people in common (PIC) between two users on a social networking platform or service.

On a social network, when a user A visits a user B's profile, user A may be provided with a list of people in common between user A and user B. Based on the list of people in common, user A can determine whether user B is the person he or she knows. The more people in common, the more likely that user B is the correct person user A knows of and not someone who has a name in common with user B. Additionally, a list of people in common on a social network may allow users on the social network to discover common acquaintances that may otherwise have not been found. Connections that are access controlled, may not be included in a list of people in common, and/or privacy settings may not be properly respected in an effort to provide a compelling list of people in common to a user.

A social networking system may only include publicly visible connection in finding people in common. For example, user A connects to user B. User C also connects to user B. If the connection of user B to user C is visible to the public, user B is identified as person in common between user A and user C. By focusing only on publicly visible connections, valuable connections may not necessarily be discovered by a user, and enjoyment of the social networking system may be limited.

SUMMARY

According to one innovative aspect of the subject matter described in this disclosure, a system includes a processor and a memory storing instructions that, when executed, cause the system to: receive a request for a set of people in common between a first user and a second user on a social networking service; determine one or more publicly visible connections of the first user and the second user from the social networking service; determine one or more connections visible only to members of an accessible group of the first user and the second user from the social networking service, access to the one or more connections visible only to members of the accessible group controlled by security permissions; determine the set of people in common between the first user and the second user using the one or more publicly visible connections, the one or more connections and the security permissions of the first user; and provide the first user with the set of people in common between the first user and the second user from the perspective of the first user.

In general, another innovative aspect of the subject matter described in this disclosure may be embodied in methods that include: receiving a request for a set of people in common between a first user and a second user on a social networking service; determining one or more publicly visible connections of the first user and the second user from the social networking service; determining one or more connections visible only to members of an accessible group of the first user and the second user from the social networking service, access to the one or more connections visible only to members of the accessible group controlled by security permissions; determining the set of people in common between the first user and the second user using the one or more publicly visible connections, the one or more connections and the security permissions from a perspective of the first user; and providing the first user with the set of people in common between the first user and the second user from the perspective of the first user.

Other aspects include corresponding methods, systems, apparatus, and computer program products for these and other innovative aspects.

These and other implementations may each optionally include one or more of the following features. For instance, the features may further include: a connection between at least one person in the set of people in common and the second user is a connection visible only to members of an accessible group of the at least one person in the set of people in common and is visible from the perspective of the first user. For instance, the features may further include: a connection between at least one person in the set of people in common and the second user is a publicly visible connection of the at least one person in the set of people in common. For instance, the operations may further include: determining a total number of people in common; and generating a truncated set of people in common, a maximum size of the truncated set is smaller than the total number of people in common. For instance, the features may further include generating the truncated set of people in common is performed prior to receiving the request for the set of people in common. The features may further include the total number of people in common and the truncated set of people in common are updated at a predetermined interval. For instance, the operations may further include removing, from the truncated set of people in common, the at least one person in the set of people in common if there is a predetermined interaction limitation associated with a connection between the at least one person in the set of people in common and the first user or the second user. For instance, the features may further include the set of people in common is sorted based on a criterion, e.g. the truncated set of people in common is sorted based on affinities with the first user. For instance, the operations may further include removing, from the set of people in common, one or more people in common having a number of public followers exceeding a predetermined threshold.

The present disclosure may be particularly advantageous in a number of respects. The system may be allow users to more readily discover other users to connect with. Users of the social networking service may have an increased level enjoyment and use of the social networking service. Additionally while allowing users to more easily discover other users, the system provides rigorous enforcement of users' privacy settings. Moreover, the present disclosure balances pre-computation efficiency savings with limited storage and the dynamic nature of user's privacy settings.

BRIEF DESCRIPTION OF THE DRAWINGS

The disclosure is illustrated by way of example, and not by way of limitation in the figures of the accompanying drawings in which like reference numerals are used to refer to similar elements.

FIG. 2B is a graphic representation of an example connection between two users.

FIGS. 2C-2E are graphic representations of example user created groups.

DETAILED DESCRIPTION

The present disclosure relates to systems and methods for identifying people in common between two users on a social network service. The present disclosure advantageously provides systems and methods for identifying people in common between a first user and a second user from a perspective of the first user. In some instances, a request for people in common from the perspective of the first user is generated by the first user to view people in common between himself and a second user. In some instances, a request for people in common from a perspective of the first user may not be generated by the first user but instead generated by, for example, the social network engine or a client device to identify people in common between the first user and a second user. In this example, the set of identified people in common is then presented to the first user in order to provide the first user with extra information, facilitate the first user in making decisions and therefore improve the first user's experience on the social network.

Figure 1:
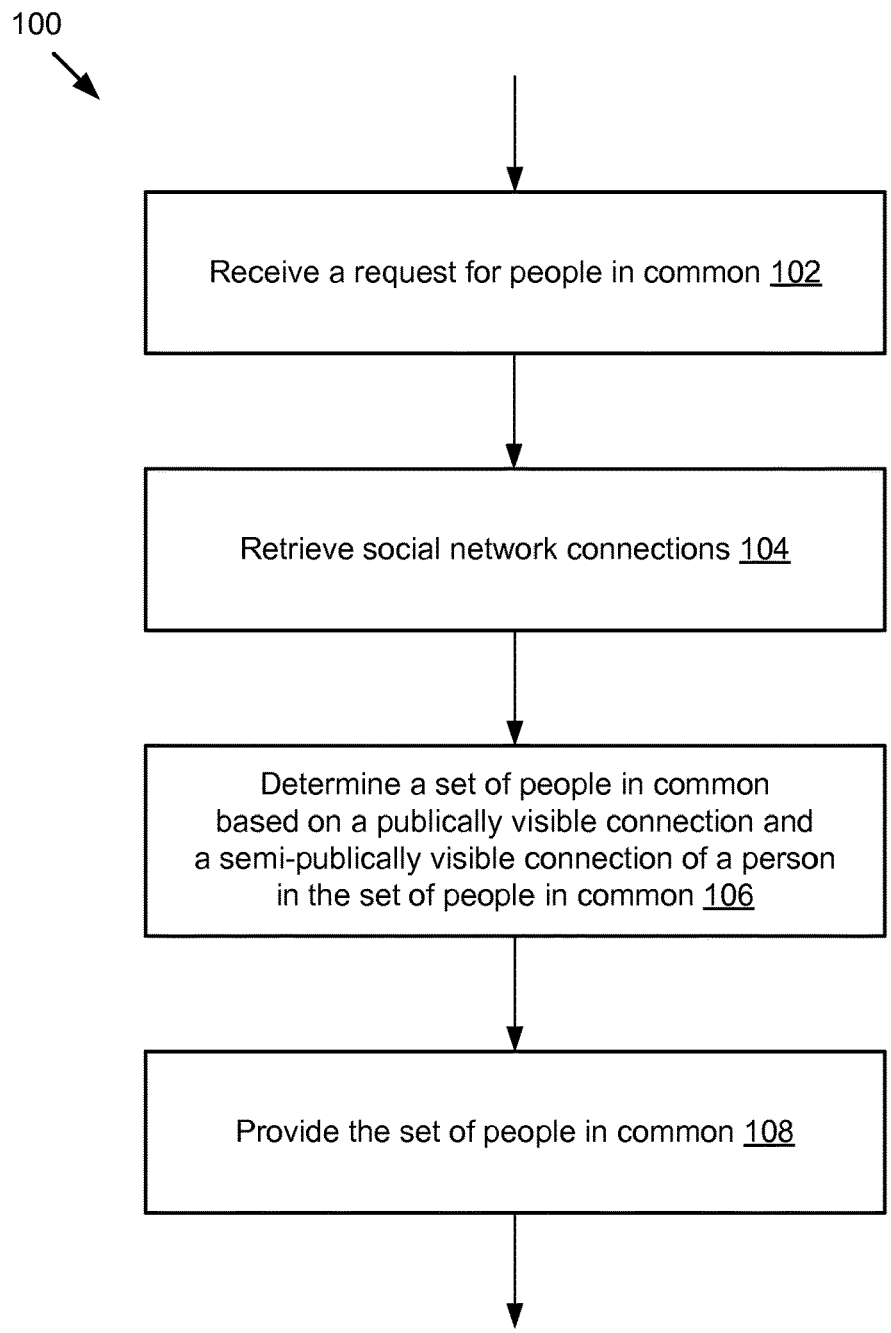
FIG. 1 is a flowchart of an example method for identifying people in common.

FIG. 1 is a flow chart illustrating an example method 100 for identifying people in common. In some implementations, the method 100 for identifying people in common may be performed by a people in common (PIC) identification application 403. An example implementation of a PIC identification application 403 is described in more detail in FIGS. 4 and 5. The PIC identification application 403 includes a controller 502, a PIC identifying component 504, an interaction limitation checking component 506, a ranking component 508 and a graphical user interface (GUI) component 510.

In some instances, the controller 502 receives 102 a request for people in common. For example, the request for people in common may be a request for people in common between a first user and a second user from a perspective of the first user. A user's perspective may differ from other users based on access control settings on the social network. Some users may limit visibility of their connections for privacy reasons. Accordingly a user may not necessarily have access to see that a connection between users exists, and therefore the user's perspective may be limited such that certain connections in the social network are not visible. In some implementations, the controller 502 retrieves 104 social network connections. For example, the controller 502 retrieves data describing social network connections, e.g. social graphs. In some instances, the controller 502 may retrieve social network connections and privacy status associated with each social network connection. The privacy status may include an indicator of connection visibility, e.g. publicly visible, semi-publicly visible, and private. Thus, access to publicly visible, semi-publicly visible, and private connections may be controlled by security permissions.

In some examples, publicly visible connections of user X to user Y may be visible to all members of the social network. Semi-publicly visible connections of user X to user Y may be visible only to members of an accessible group and not visible to the public in general. Private connections of user X to user Y may be visible only to user X. In some cases, one or more publicly visible connections of a first user and a second user are determined from a social networking service. Moreover, one or more semi-publicly visible connections of the first user and the second user are determined from the social networking service. Connections between users may be directional. For example, in a unidirectional connection user X may follow user Y while user Y may not necessarily follow user X. In doing so, user X may choose to see messages, updates, content, etc. made available by user Y while user Y may not necessarily receive any information about user X. In a bi-directional connection user X may follow user Y, and user Y may follow user X. Thus, user Y and user X may stay informed regarding each other. Each user X and Y may receive messages, updates, content, etc. made available by the other user.

A set of people in common is determined 106 based on a publicly visible connection and a semi-publicly connection of a person in the set of people in common. In some instances the PIC identifying component 504 may perform this determination. The PIC identifying component may take into consideration publicly visible connections and semi-publicly visible connections of people in common included in the set. In other instances, the determination 106 of set of people in common may be bifurcated. For example, a public PIC component may determine publicly visible connections and an access control component may determine semi-publicly connections while providing enforcement of privacy settings. Other components may be included or used to determine 106 the set of people in common. The PIC identifying component 504 may provide 108 the set of people in common. For example, PIC identifying component 504 instructs the GUI component 510 to present to the first user the set of people in common between the first user and the second user from the perspective of the first user via user interfaces. Examples of graphical user interfaces are described in more detail in FIGS. 6 and 7. Thus, the set of people in common between the first user and the second user from the perspective of the first user is determined using the one or more publicly visible connections and the one or more semi-publicly visible connections and using security permissions from a perspective of the first user.

A social networking service or platform includes a social network application and a database storing a social graph. A social network can be a type of social structure where the users can be connected by a common feature. The common feature includes relationships/connections, e.g., friendship, family, work, an interest, etc. The common features may be provided by one or more social networking systems, including explicitly-defined relationships and relationships implied by social connections with other online users, where the relationships form a social graph. In some examples, the social graph can reflect a mapping of these users and how they may be related.

Figure 2A:
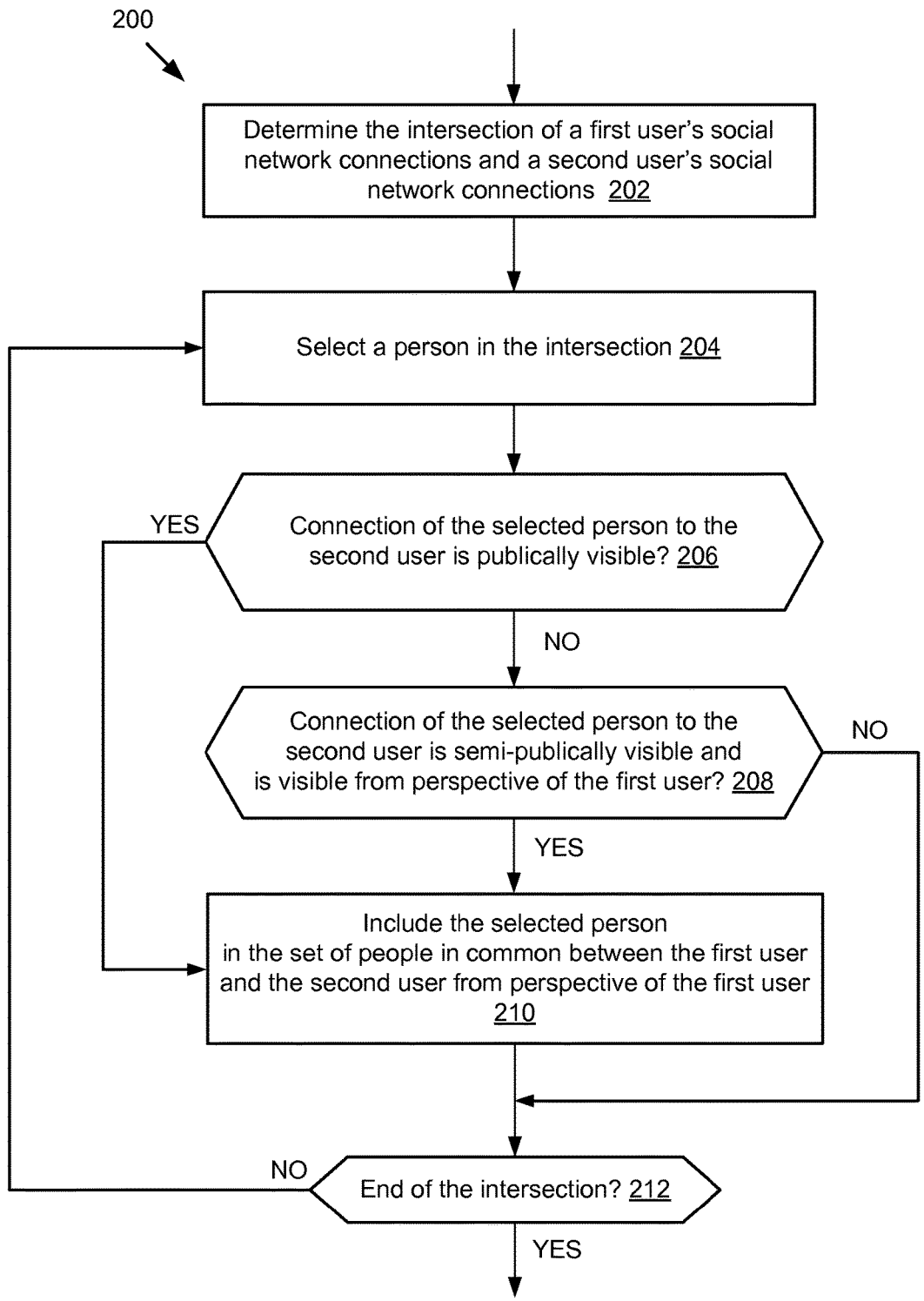
FIG. 2A is a flowchart of an example method for determining a set of people in common between a first user and a second user from a perspective of the first user.

FIG. 2A is a flow chart illustrating an example method 200 for determining a set of people in common between a first user and a second user from a perspective of the first user. In some implementations, the PIC identifying component 504 determines 202 the intersection of the first user's social network connections and the second user's social network connections. The PIC identifying component 504 selects 204 a person in the intersection. The PIC identifying component 504 determines 206 whether a connection of the selected person to the second user is publicly visible.

If the connection of the selected person to the second user is publicly visible, the selected person is included 210 in the set of people in common between the first user and the second user from the perspective of the first user. In some instances, the PIC identifying component 504 may perform this inclusion 210 of the selected person into the set of people in common. In another instances, the ranking component 508 or controller component 502 may include 210 the selected person in the set of people in common. Other components may be included or used to include 210 the selected person in the set of people in common. The intersection of the first user's social network connections and the second user's social network connections is the set of users that are in both the first user's social network connections and the second user's social network. The PIC identifying component 504 then continues to identify people in common by repeating the operations 204-210 until reaching 212 the end of the intersection.

If the connection of the selected person to the second user is not publicly visible, the PIC identifying component 504 continues to determine 208 whether the connection of the selected person to the second user is semi-publicly visible and is visible from the perspective of the first user. A social network connection is visible from the perspective of the first user when the first user is able to see such connection. Some users may limit visibility of their connections for privacy reasons. Accordingly a user may not have access to see that a connection between users exists, and therefore the user's perspective may be limited such that certain connections in the social network may not be visible. For example, user B may be an architect. User B 220 may establish a connection to a partner of his client, user C 224. The connection established by user B 220 to user C 224 may only be visible to people in the group "Works" and the group "Engineering" 222 as shown in FIG. 2B. Groups may allow a user to categorize users. For example, a user may organize users they know in real life by the context or situation in which they know them (e.g. family, co-workers, close friends, etc.). Groups may allow a user to specify content sharing and privacy settings on a group-by-group basis. One such privacy setting may include which of the user's connections are visible to which groups. If user A 230 is in group "Works" or group "Engineering", as respectively shown in FIGS. 2C and 2D, user A 230 will be able to see user B's 220 connection 222 to user C 224, or in other words, the connection 222 of user B 220 to user C 224 is visible from the perspective of user A 230. If user A 230 is neither group "Works" or group "Engineering" but instead in group "Skate Buddies" of user B, as shown in FIG. 2E for example, user A will not be able to see user B's connection to user C. In another instance, if user A 230 does not login to the social network and views user B's connections as public user, he likewise will also not be able to see user B's connection to user C. The connection of user B to user C is not visible from the perspective of user A 230. In some implementations, a connection from user B to user C is considered to belong to user B and the visibility of such connection is under the control of user B. In some instances, a user may belong to more than one group. Where a user belongs to more than one group and the groups have different connection visibility privacy settings, the most permissive connection visibility privacy setting may be applied. In an alternative example, the most restrictive privacy setting of a group may be applied to a user where the user belongs to more than one group.

Proceeding with example method 200, if the connection of the selected person to the second user is semi-publicly visible and is visible from the perspective of the first user, the PIC identifying component 504 includes 210 the selected person in the set of people in common between the first user and the second user from the perspective of the first user, and continues to identify people in common by repeating the operations 204-212 until reaching the end of the intersection.

If the connection of the selected person to the second user is not semi-publicly visible, or is semi-publicly visible but not visible from the perspective of the first user, the PIC identifying component 504 continues to identify people in common by repeating the operations 204-212 until there are no more people to iterate through in the intersection. Further, the selected person may not be included in the set of people in common between the first user and the second user from the perspective of the first user.

In some implementations, the order of the two determinations in decision blocks 206 and 208 of the example method 200 may be interchangeable.

Figure 3A:
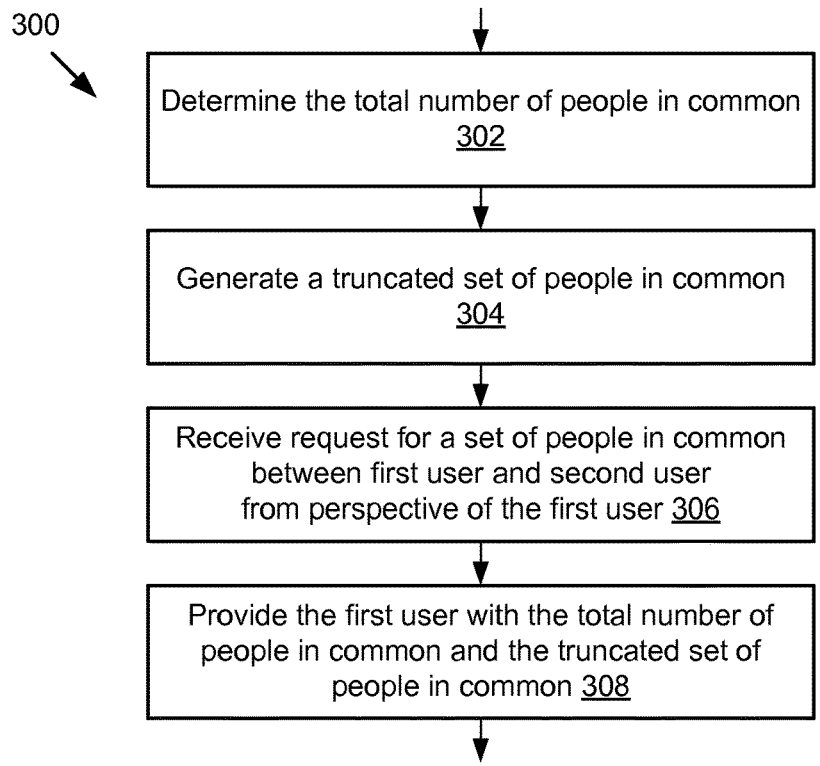
FIGS. 3A-3C are flowcharts of example methods for providing a truncated set of people in common to the first user.
Figure 3B:
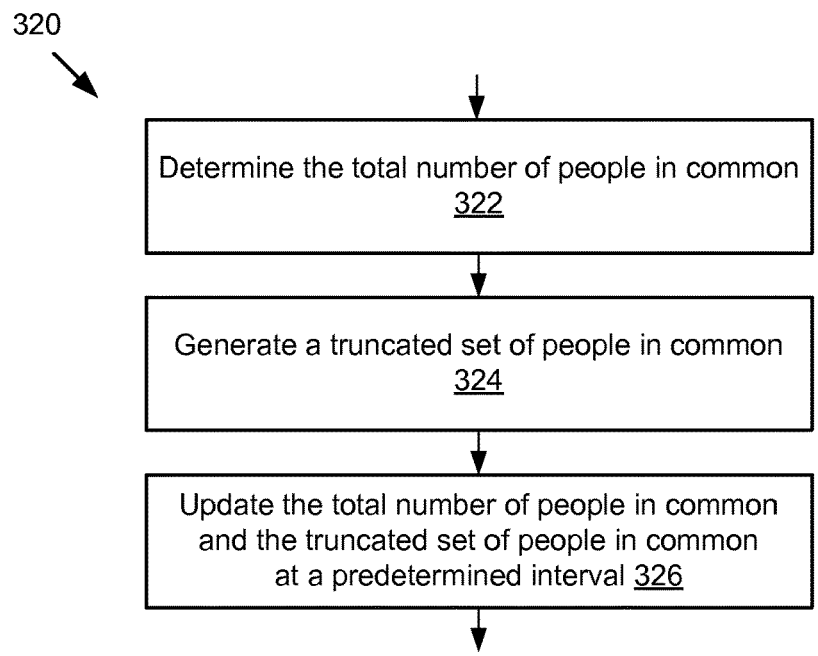
Figure 3C:
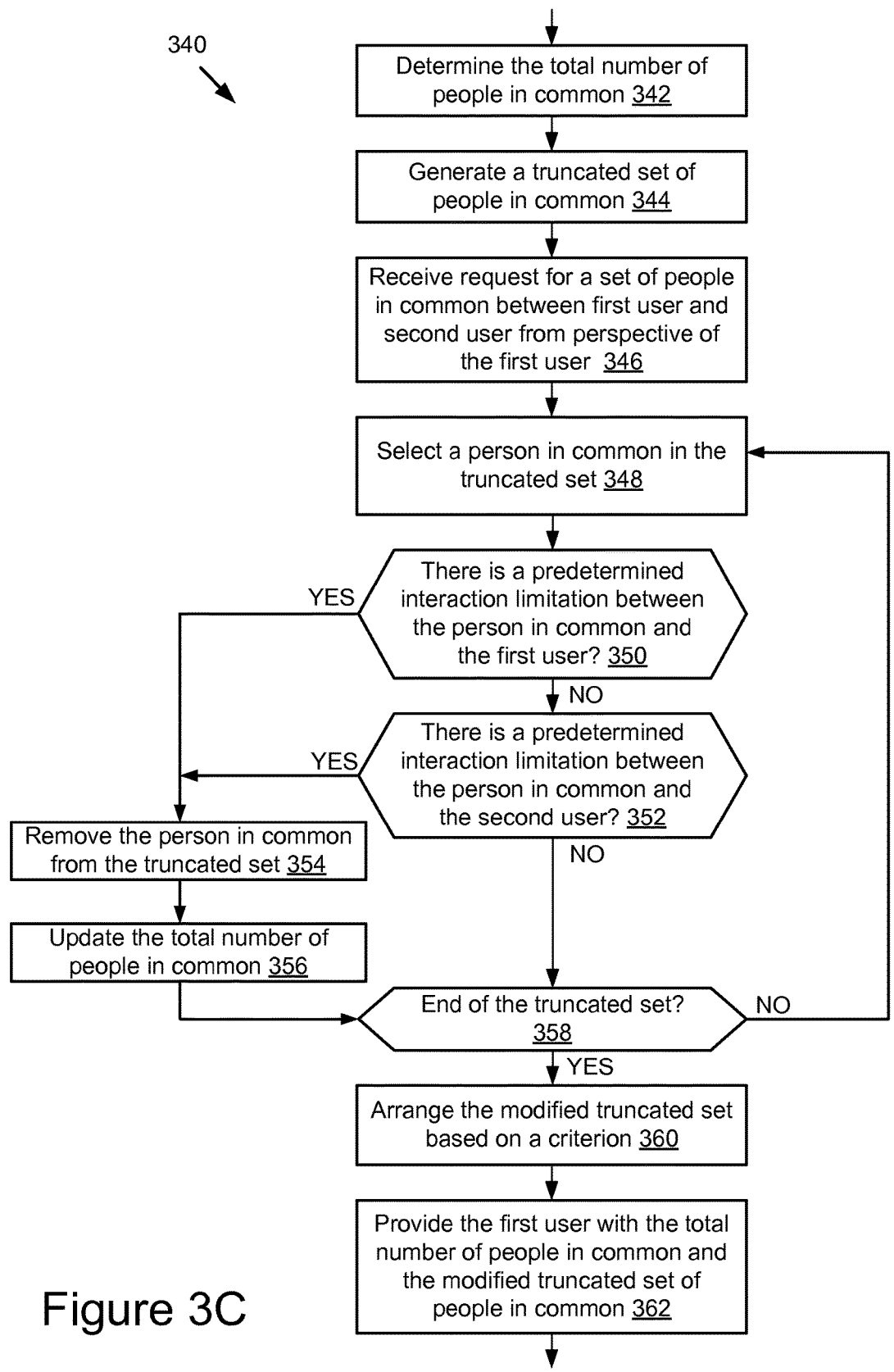

FIGS. 3A-3C are flowcharts of example methods for providing a truncated set of people in common to the first user. FIG. 3A illustrates an example method 300 in which the first user is provided with a truncated set of people in common, instead of a complete set of people in common, in response to a request for people in common from the perspective of the first user. In some implementations, the PIC identifying component 504 determines 302 the total number of people in common. The PIC identifying component 504 generates 304 a truncated set of people in common between the first user and the second user from the perspective of the first user. The truncated set of people in common may include no more than a maximum size of people in common, and generally the maximum size of the truncated set may be smaller than the total number of people in common. However, in some cases the total number of people in common between the first user and the second user may be smaller or equal to the predetermined maximum size. The maximum size may be predetermined, e.g. the PIC identifying component 504 may establish the value of maximum size at eight. In some instances, there may be more than eight people in common between the first user and the second user. For example, the first user and the second user may have in total twenty people in common, but in some cases only a truncated set of eight people in common is generated and presented to the first user. In some instances, the total number of people in common between the first user and the second user may be smaller or equal to the predetermined maximum size. For example, the first user and the second user may have in total five people in common. In this example, the PIC identifying component 504 may determine all people in common, e.g. the complete set of five people in common is generated and displayed to the first user.

The truncated set of people in common may be selected through various criteria. For example, the truncated set of people in common may be selected based on affinity with the first user. Affinity with the first user may be data describing a degree of closeness between a person in common and the first user. In some implementations, the set of people in common may be sorted based at least in part on frequency or recency of people in common's interaction with the first user. Once sorted, the truncated set of people in common may be selected from the top or bottom of the sorted set of people in common. For example, one or more people in common that interact with the first user more frequently or more recently will be assigned higher positions and will therefore be more likely to be included on the truncated set of people in common. Other criteria that may be used to determine the truncated set of people in common include the number of messages sent between users, the length of messages sent between users, the number and quality of emotive words included in messages sent between users, the number of people in common between users, geographic locations of users, the number of similar comments and affirmations made by users to posts on content streams, similarity of profiles between users, common employers of users, common industries of users, common educational institutions of users, languages used on the system, etc.

In some implementations, the PIC identifying component 504 performs the determinations of the total number of people in common and the truncated set prior to receiving the request for people in common from the perspective of the first user. When the controller 502 receives 306 such request, the total number of people in common and the truncated set are ready to be delivered to the first user at the request time. The PIC identifying component 504 provides 308 the first user with the total number of people in common and the truncated set of people in common. For example, PIC identifying component 504 instructs the GUI component 510 to present to the first user the total number and the truncated set of people in common between the first user and the second user from the perspective of the first user via user interfaces. Examples of graphical user interfaces are described in more detail in FIGS. 6 and 7.

Figure 4:
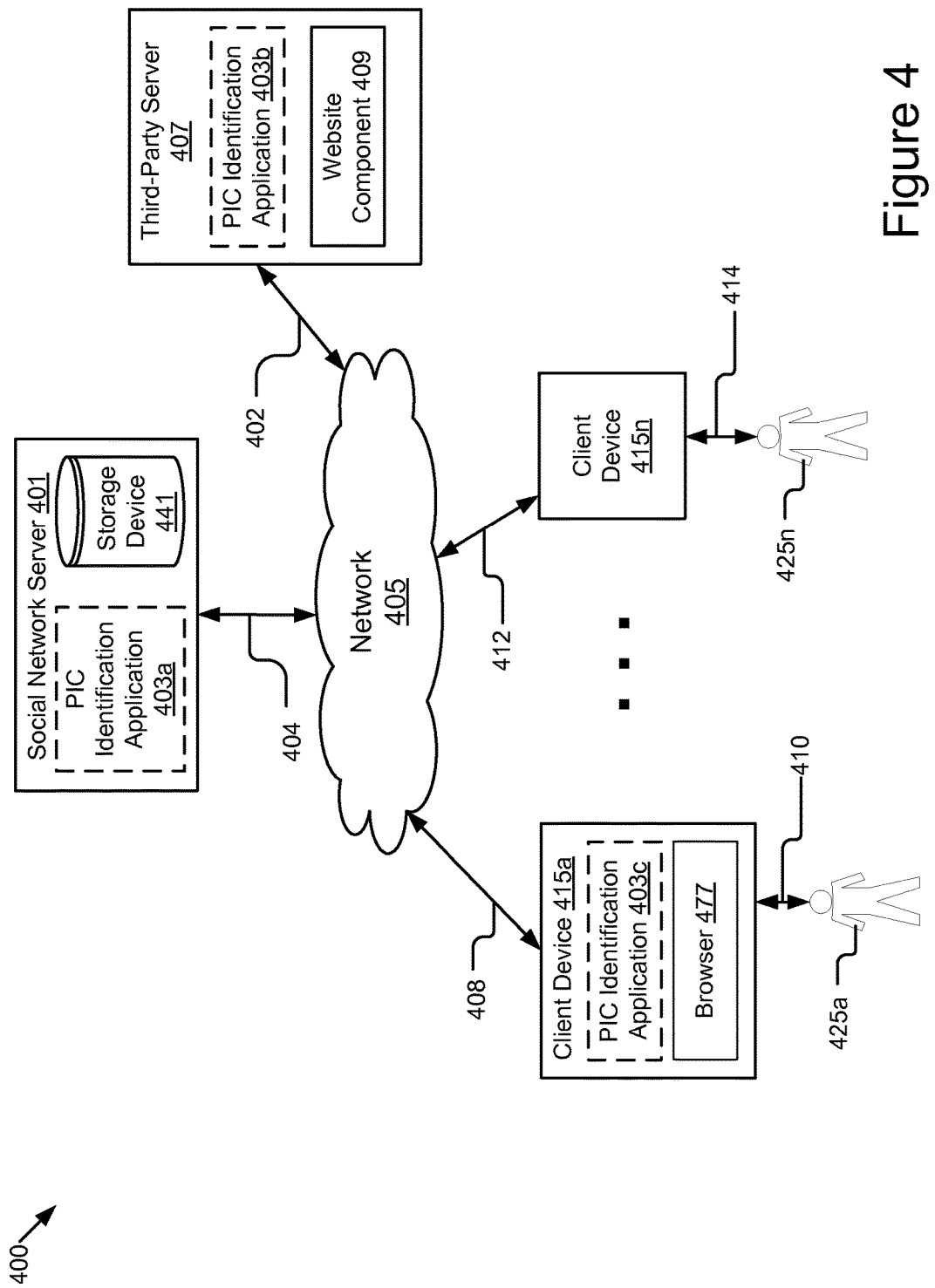
FIG. 4 is a block diagram illustrating an example system for identifying people in common.

FIG. 3B illustrates an example method 320 in which the total number of people in common and the truncated set of people in common are updated. In some implementations, the PIC identifying component 504 determines 322 the total number of people in common. The PIC identifying component 504 generates 324 a truncated set of people in common between the first user and the second user from the perspective of the first user. The total number of people in common and the truncated set may be stored in a storage device, for example a storage device 441 in the system 400 for identifying and providing people in common as shown in FIG. 4. The PIC identifying component 504 may update 326 the total number of people in common and the truncated set of people in common at a predetermined interval, for example every four hours, so that PIC information being predetermined and stored are kept up-to-date with changes in privacy status of social network connections, if any. In other instances, the interval may be based on idle computing capacity and/or frequency of use by a user, for example. In some instances, the interval may not be periodic, but rather the PIC identifying component 504 may update 326 the total number of people in common and the truncated set of people in common when requested by a user.

FIG. 3C illustrates an example method 340 in which the predetermined and stored PIC information is further subjected to an interaction limitation check. Before providing the stored information of people in common to the first user upon receiving a PIC request, it may be desirable to check interaction limitations because the privacy settings associated with social network connections involved may have changed since the most recent update. Performing an interaction limitation check is to avoid accidentally disclosing connections that the involved social network users, e.g. the second user or the people in common, no longer want the first user to know about.

For example, user B establishes that his connection to user C, a partner of his client, is visible only to people in group "Works" and group "Engineering". User A is user B's employee and is included in the group "Works". Accordingly, the connection of user B to user C is visible from the perspective of user A. User B was recently informed that user A has secretly opened a new competing company, and decided to block user A on his social network where he has valuable connections with clients, e.g. user C. In this example, the recently changed privacy status associated with user B's connection to user A, e.g. blocking, may not be reflected in the stored information of people in common since the last update. In some implementations, an interaction limitation checking component 506 subjects the stored PIC information to the interaction limitation check and removes user B from the set of people in common between user A and user C. Accordingly, user B is not presented to user A as person in common.

In some implementations, the PIC identifying component 504 determines 342 the total number of people in common. The PIC identifying component 504 generates 344 a truncated set of people in common between the first user and the second user from the perspective of the first user. In some implementations, the total number of people in common and the truncated set may be stored in a storage device. In some implementations, the total number of people in common and the truncated set may be updated at a predetermined interval. When the controller 502 receives 346 a request for a set of people in common between the first user and second user from the perspective of the first user, the interaction limitation checking component 506 performs interaction limitation check on the stored truncated set and the total number of people in common before providing the information to the first user.

In some instances, the interaction limitation checking component 506 selects 348 a person in common in the truncated set. The interaction limitation checking component 506 determines 350 whether there is a predetermined interaction limitation between the selected person in common, e.g. user B, and the first user, e.g. user A. If there is a predetermined interaction limitation between the person in common and the first user, e.g. user B blocks user A or user A blocks user B, the interaction limitation checking component 506 modifies the truncated set of people in common by removing 354 the selected person in common, e.g. user B, from the truncated set. The interaction limitation checking component 506 accordingly updates 356 the total number of people in common, for example, by reducing the total number of people in common by one.

If there is no predetermined interaction limitation between the selected person in common and the first user, the interaction limitation checking component 506 continues to determine 352 whether there is a predetermined interaction limitation between the selected person in common, e.g. user B, and the second user, e.g. user C. If there is a predetermined interaction limitation between the person in common and the second user, e.g. user B blocks user C or user B blocks user C, the interaction limitation checking component 506 modifies the truncated set of people in common by removing 354 the selected person in common from the truncated set and updates 356 the total number of people in common.

If there is no predetermined interaction limitation between the selected person in common and the second user, the interaction limitation checking component 506 leaves the person in common in the truncated set and continues to perform interaction limitation check on other people in common by repeating the operations 348-356 until reaching 358 the end of the truncated set. Examples of an interaction limitation may include, but are not limited to, permanently blocking, temporarily blocking, ignoring, adding to an unwelcome list or blacklist, etc.

In some instances, the interaction limitation checking component 506 instructs the ranking component 508 to arrange 360 the modified truncated set, which is a result of interaction limitation check, based on a criterion. In some implementations, the ranking component 508 ranks people in common based at least in part on the affinities with the first user, e.g. the user to which the modified truncated set of people in common is presented, here user A. Affinity with the first user may be data describing a degree of closeness between a person in common and the first user. In some implementations, the set of people in common may be sorted based at least in part on frequency or recency of people in common's interaction with the first user. For example, one or more people in common that interact with the first user more frequently or more recently will be assigned higher positions in the ranked set of people in common.

In some instances, the ranking component 508 provides 362 the first user with the total number of people in common and the modified truncated set of people in common being ranked. For example, the ranking component 508 instructs the GUI component 510 to present to the first user the total number of people in common and/or the modified truncated set after being ranked via user interfaces. Examples of graphical user interfaces are described in more detail in FIGS. 6 and 7.

The methods may provide a user with a more complete and/or more valuable list of people in common. For example, user B may establish a connection to user C that is non-visible to the public but visible to a certain group of users (e.g. a group of college friends). If user A is included in user B's college friend group, user A will be able to see user B as a person in common between user A and user C although the connection from user B to user C is not visible to the public. User B is therefore a more valuable social proof to user A than other people in common whose connection to user C is visible to everyone. The methods may take into account users' personalized information when identifying people in common without violating users' privacy. In the above example, user B is provided as a valuable connection to user A without disclosing the connections that user B wishes to maintain being visible only to certain users. Since publicly visible connections as well as semi-publicly visible connections are considered, a larger number of people in common can be identified and presented to user A. The methods may determine people in common by combining live computation at the serving time and pre-computation. For example, the methods may determine a total number of people in common and a truncated set of people in common prior to receiving the request for people in common from the perspective of the first user. Accordingly, the truncated set and the total number of people in common are ready to be presented to the first user upon receiving such request. The methods perform the determination of a complete set of people in common when receiving a request to view all people in common from the first user. In general, users do not necessarily request to view all people in common. Therefore, determining a complete list of people in common at the request time, e.g. live computation, reduces the amount of pre-computation and storage size required, while predetermining and storing the truncated set reduces the amount of computation at the request time and in-service latency. The methods therefore may be capable of balancing the computation cost and storage cost, as well as providing a low latency and high efficiency service to users.

FIG. 4 illustrates a block diagram of some implementations of a system 400 for identifying and providing people in common to a first user. The illustrated system 400 includes client devices 415a . . . 415n that can be accessed by users 425a . . . 425n, a social network server 401 and a third-party server 407. In FIG. 4 and the remaining figures, a letter after a reference number, e.g., "415a," represents a reference to the element having that particular reference number. A reference number in the text without a following letter, e.g., "415," represents a general reference to instances of the element bearing that reference number. In the illustrated implementation, these entities of the system 400 are communicatively coupled via a network 405.

The client devices 415a, 415n in FIG. 4 are used by way of example. While FIG. 4 illustrates two client devices 415a and 415n, the present disclosure applies to a system architecture having one or more client devices 415. Furthermore, although FIG. 4 illustrates one network 405 coupled to the client devices 415, the social network server 401 and the third-party server 407, in practice one or more networks 405 can be connected to these entities.

In some instances, the PIC identification application 403a may be operable on the social network server 401, which is coupled to the network 405 via signal line 404. The social network server 401 can be a hardware server that includes a processor, a memory and network communication capabilities. In some implementations, the social network server 401 sends and receives data to and from one or more of the client devices 415a, 415n and the third-party server 407 via the network 405. The social network server 401 also includes a storage device 441 and a social network application (not shown) that can be part of the PIC identification application 403a or a standalone application.

The storage device 441 stores a social graph that includes the relationship between people in a social network. For example, when a first user follows a second user, the relationship is a one-way connection outgoing from the first user and incoming to the second user. On the social graph, the first user is represented as an origin node and the second user is represented as an ending node. The connection is the outgoing relationship association or outgoing edge of the first user, and incoming relationship association or incoming edge of the second user. The connection from the first user to the second user belongs to the first user and the first user can control the visibility of such connection. For example, the first user may establish the connection to be publicly visible. Any member of the social network can see the first user is following the second user. In other words, the first user is a public follower of the second user. The connection from the first user to the second user is represented on the social graph as a public incoming edge of the second user. When the first user and the second user follow each other, the relationship is a mutual connection. The first user can control the visibility of the directed connection from the first user to the second user and the second user can control the visibility of the directed connection from the second user to the first user. For example, the first user may hide from the public his connection to the second user while the second user does not hide from the public her connection to the first user. A third user viewing the first user's profile will not know the first user is following the second user. However, the third user viewing the second user's profile will know the second user is following the first user.

The relationship associations can be described in terms of visibility. The relationships on the social network include publicly visible connections, semi-publicly visible connections and private connections. For example, private connections of the first user to the second user may be visible only to the first user. Publicly visible connections of the first user to the second user may be visible to all members of the social network, regardless of whether or not the social network members are connected to the first user. Semi-publicly visible connections of the first user to the second user may be visible only to members of an accessible group and not visible to the public in general. For example, the first user may configure his connection to second user as a semi-publicly visible connection and visible only to a group of family members. If a third user is included in the family group of the first user, the third user will be able to see first user's connection to the second user. Otherwise, the third user will not know the first user is connected to the second user.

Furthermore, the social network server 401 may be representative of one social network and there may be multiple social networks coupled to the network 405, each having its own server, application and social graph. For example, a first social network may be more directed to business networking, a second may be more directed to or centered on academics, a third may be more directed to local business, a fourth may be directed to dating and others may be of general interest or a specific focus.

In some instances, the PIC identification application 403b may be stored on a third-party server 407, which is connected to the network 405 via signal line 402. In some implementations, the third-party server 407 can be a hardware server that includes a processor, a memory and network communication capabilities. The third-party server 407 sends and receives data to and from other entities of the system 400 via the network 405. In some instances the third-party server 407 includes a website component 409 for generating a website. In this example, the PIC identification application 403b could be an application programming interface (API) for requesting information from the social network server 401 about users associated with the social network. The website component 409 incorporates the social information into the website. For example, the PIC identification application 403b provides information of people in common that the website component 409 incorporates into a website as a social proof. The website may present a statement that the website owner has, for example, two millions followers on the social network including social network users who are the viewer's friends. The specified social network users are people in common between the viewer and the website owner on the social network. Viewing the particular people in common provides the viewer a quick and easy way to confirm whether he or she may be interested in the website owner. While FIG. 4 includes one third-party server 407, the system 400 may include one or more third-party servers 107.

In some instances, the PIC identification application 403c may be stored on a client device 415a, which is connected to the network 405 via signal line 408. In some implementations, the client device 415a, 415n may be a computing device that includes a memory and a processor, for example a laptop computer, a desktop computer, a tablet computer, a mobile telephone, a personal digital assistant (PDA), a mobile email device, a portable game player, a portable music player, a television with one or more processors embedded therein or coupled thereto or other electronic device capable of accessing a network 405. In some instances, the client device 415a includes a browser 477 for accessing online services. In the illustrated implementation, the user 425a interacts with the client device 415a via signal line 410. The client device 415n is communicatively coupled to the network 405 via signal line 412. The user 425n interacts with the client device 415n via signal line 414. In some instances, the PIC identification application 403c acts in part as a thin-client application that may be stored on the client device 415a, 415n and in part as components that may be stored on the social network server 401. For example, the social network server 401 stores the user data in the storage device 441 and generates information of people in common for the user 425a. The PIC identification application 403c sends instructions to the browser 477 to display the information of people in common.

The PIC identification application 403 can be code and routines for identifying and providing people in common to a user in a social network. In some instances, the PIC identification application 403 can be implemented using hardware including a field-programmable gate array (FPGA) or an application-specific integrated circuit (ASIC). In some other instances, the PIC identification application 403 can be implemented using a combination of hardware and software. In some instances, the PIC identification application 403 may be stored in a combination of the devices and servers, or in one of the devices or servers.

In some instances, the PIC identification application 403 receives a request for a set of people in common between a first user and a second user on a social network from a perspective of the first user. In some examples, a request for people in common from a perspective of the first user may be a request generated by the first user to view people in common between the first user and a second user. In some examples, a request for people in common from a perspective of the first user may not be generated by the first user but instead generated by, for example, the social network server 401 or client device 415 to identify people in common between the first user and a second user. In the context of determining people in common from the perspective of the first user, the second user may be a social network member whose profile is being viewed by the first user. In some instances, the second user may be a suggested user that the social network recommends as people the first user may know or may want to connect with. In some instances, the second user may be a person in a people list that information of people in common between the first user and that person are provided by the social network, in order to facilitate the first user in quickly evaluating the connection between himself and the particular person. Other examples of second user are possible. In the social network, a connection from a first user to a second user belongs to the first user and the visibility of such connection is under the control of the first user.

The PIC identification application 403 retrieves social network connections of the first user and the second user (e.g., social network connections are represented on social graphs) and determining a set of people in common between the first user and the second user from the perspective of the first user. In determining the set of people in common, the PIC identification application 403 relies at least in part on a publicly visible connection and a semi-publicly visible connection of at least one person in the set of people in common. The PIC identification application 403 provides to the first user the set of people in common between the first user and the second user from the perspective of the first user. The PIC identification application 403 is described below in more detail with reference to FIG. 5.

The network 405 can be a conventional type, wired or wireless, and may have numerous different configurations including a star configuration, token ring configuration or other configurations. Furthermore, the network 405 may include a local area network (LAN), a wide area network (WAN) (e.g., the Internet), and/or other interconnected data paths across which multiple devices may communicate. In some instances, the network 405 may be a peer-to-peer network. The network 405 may also be coupled to or includes portions of a telecommunications network for sending data in a variety of different communication protocols. In some instances, the network 405 includes Bluetooth communication networks or a cellular communications network for sending and receiving data including via short messaging service (SMS), multimedia messaging service (MMS), hypertext transfer protocol (HTTP), direct data connection, WAP, email, etc.

Figure 5:
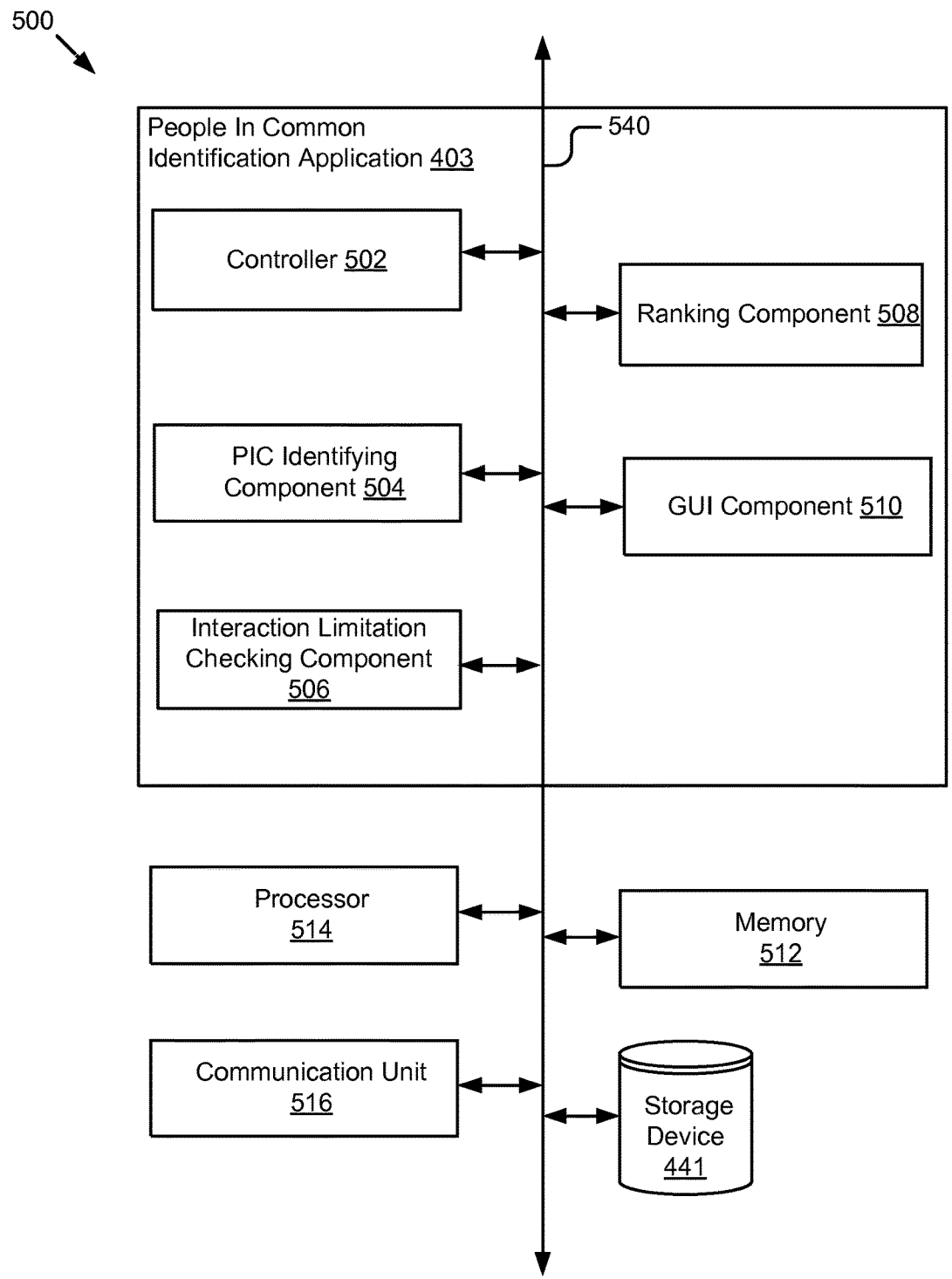
FIG. 5 is a block diagram illustrating an example of a PIC identification application.

Referring now to FIG. 5, an example of the PIC identification application 403 is shown in more detail. FIG. 5 is a block diagram of a computing device 500 that includes a PIC identification application 403, a processor 514, a memory 512 and a communication unit 516 according to some examples. In some implementations, the computing device 500 additionally includes a storage device 441. The components of the computing device 500 are communicatively coupled by a bus 540. In some instances, the computing device 500 can be one of a social network server 401, a client device 415 and a third-party server 407.

The processor 514 includes an arithmetic logic unit, a microprocessor, a general purpose controller or some other processor array to perform computations and provide electronic display signals to a display device. The processor 514 is coupled to the bus 540 for communication with the other components. Processor 514 processes data signals and may include various computing architectures including a complex instruction set computer (CISC) architecture, a reduced instruction set computer (RISC) architecture, or an architecture implementing a combination of instruction sets. Although FIG. 5 includes a single processor 514, multiple processors 514 may be included. Other processors, operating systems, sensors, displays and physical configurations are possible.

The memory 512 stores instructions and/or data that may be executed by the processor 514. The memory 512 is coupled to the bus 540 for communication with the other components. The instructions and/or data may include code for performing the techniques described herein. The memory 512 may be a dynamic random access memory (DRAM) device, a static random access memory (SRAM) device, flash memory or some other memory device. In some instances, the memory 512 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 516 transmits and receives data to and from at least one of the client device 415, the third-party server 407 and the social network server 401 depending upon where the PIC identification application 403 may be stored. The communication unit 516 is coupled to the bus 540. In some instances, the communication unit 516 includes a port for direct physical connection to the network 405 or to another communication channel. For example, the communication unit 516 includes a USB, SD, CAT-5 or similar port for wired communication with the client device 415. In some instances, the communication unit 516 includes a wireless transceiver for exchanging data with the client device 415 or other communication channels using one or more wireless communication methods, including IEEE 802.11, IEEE 802.16, BLUETOOTH® or another suitable wireless communication method.

In some instances, the communication unit 516 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some instances, the communication unit 516 includes a wired port and a wireless transceiver. The communication unit 516 also provides other conventional connections to the network 405 for distribution of files and/or media objects using standard network protocols including TCP/IP, HTTP, HTTPS and SMTP, etc.

The storage device 441 can be a non-transitory memory that stores data for providing the functionality described herein. The storage device 441 may be a dynamic random access memory (DRAM) device, a static random access memory (SRAM) device, flash memory or some other memory devices. In some instances, the storage device 441 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some instances, the storage device 441 stores data describing one or more social graphs. A social graph may be a representation of connections between users in a social network. In some instances, the storage device 441 stores data describing privacy status of social network connections. In some implementations, a privacy status may include visibility indicator of the connection. For example, a connection between user A and user B is publicly visible while connection of user A to user C is semi-publicly visible. The connection between user A and user B is visible to any member of the social network while connection of user A to user C is visible only to users in, for example, college group and colleague group of user A.

In some instances, the storage device 441 stores a truncated set of people in common and a total number of people in common. A truncated set of people in common may include no more than a maximum size of people in common. The maximum size of the truncated set is smaller than the total number of people in common and may be predetermined. In some instances, the truncated set of people in common and the total number of people in common may be precomputed and ready to be served to the first user at the request time. In some instances, the truncated set of people in common and the total number of people in common may be updated at a predetermined interval. For example, the truncated set and the total number of people in common are stored in the storage device 441 and updated every twenty four hours.

In the illustrated implementation shown in FIG. 5, the PIC identification application 403 includes a controller 502, a PIC identifying component 504, an interaction limitation checking component 506, a ranking component 508, and a graphical user interface (GUI) component 510. These components of the PIC identification application 403 are communicatively coupled to each other via the bus 540.

The controller 502 can be software including routines for handling communications between the PIC identification application 403 and other components of the computing device 500. In some instances, the controller 502 can be a set of instructions executable by the processor 514 to provide the functionality described below for handling communications between the PIC identification application 403 and other components of the computing device 500. In some other instances, the controller 502 can be stored in the memory 512 of the computing device 500 and can be accessible and executable by the processor 514. The controller 502 may be adapted for cooperation and communication with the processor 514 and other components of the computing device 500 via the bus 540.

The controller 502 sends and receives data, via the communication unit 516, to and from one or more of a client device 415, a social network server 401 and a third-party server 407. For example, the controller 502 receives from a client device 415, via the communication unit 516, a request for a set of people in common between a first user and a second user from the perspective of the first user and sends the PIC request to the PIC identifying component 504. In some examples, the controller 502 receives graphical data for providing a user interface to a user from the GUI component 510 and sends the graphical data to a client device 415, causing the client device 415 to present the user interface to the user.

In some instances, the controller 502 receives data from components of the PIC identification application 403 and stores the data in the storage device 441. For example, the controller 502 receives data describing one or more people in common from the PIC identifying component 504 or from ranking component 508 and stores the data in the storage device 441. For example, the controller 502 receives data describing a total number of people in common and a truncated set of people in common from the PIC identifying component 504 or from ranking component 508 and stores the data in the storage device 441.

In some instances, the controller 502 retrieves data from the storage device 441 and sends the data to components of the PIC identification application 403. For example, the controller 502 retrieves data describing social network connections, e.g. a social graph, from the storage device 441 and sends the data to the PIC identifying component 504. In some implementations, the controller 502 may retrieve social network connections and privacy status associated with each social network connection from the storage device 441. The social network connections together with their corresponding privacy status are sent to the PIC identifying component 504.

In some instances, the controller 502 generates a request for people in common from a perspective of a first user and sends the PIC request to the PIC identifying component 504. For example, when the first user views a profile of a social network user, the controller 502 may itself generate a PIC request from the perspective of the first user to determine and present to the first user people in common between the first user and a second user, e.g. the profile owner. In some implementations, the controller 502 may itself generate a PIC request from a perspective of the first user in response to pointer activity of the first user. For example, when the first user places a pointer over an object representing a user on a social network page, the controller 502 itself generates the PIC request to provide the first user with PIC information as an instant hint of the first user's relationship with the particular user.

The PIC identifying component 504 can be software including routines for identifying a set of people in common. In some instances, the PIC identifying component 504 can be a set of instructions executable by the processor 514 to provide the functionality described below for identifying a set of people in common between a first user and a second user. In some other instances, the PIC identifying component 504 can be stored in the memory 512 of the computing device 500 and can be accessible and executable by the processor 514. The PIC identifying component 504 may be adapted for cooperation and communication with the processor 514 and other components of the computing device 500 via the bus 540.

In some instances, the PIC identifying component 504 receives, from the controller 502, a request for a set of people in common between a first user and a second user from the perspective of the first user. In some instances, the PIC identifying component 504 also receives, from the controller 502, social network connections of the first user and the second user together with privacy status associated with each social network connections. The privacy status may include an indicator of connection visibility, e.g. publicly visible, semi-publicly visible, and private. In some implementations, the PIC identifying component 504 determines the intersection of the first user's social network connections and the second user's social network connections. From the determined intersection, the PIC identifying component 504 generates a set of people in common based on publicly visible connections and semi-publicly visible connections of social network users included in the determined intersection.

For example, the PIC identifying component 504 determines a set of people in common between the first user, e.g. user A, and a second user, e.g. user C, from the perspective of the user A. The PIC identifying component 504 determines the intersection of user A's social network connections and user C's social network connections. For each user included in the determined intersection, e.g. user B, the PIC identifying component 504 determine whether the connection between user B and user C is publicly visible. If the connection between user B and user C is a publicly visible connection of user B, the PIC identifying component 504 includes user B in the set of people in common between user A and user C from the perspective of user A. On the other hand, if the connection between user B and user C is not a publicly visible connection of user B, the PIC identifying component 504 continues to determine whether the connection between user B and user C is semi-publicly visible. If the connection between user B and user C is a semi-publicly visible connection of user B and is visible from the perspective of user A, the PIC identifying component 504 adds user B to the set of people in common. Connection of user B to user C is visible from the perspective of user A when user A is able to see such connection. For example, user B establishes his connection to user C to be visible only to a group of people on his social network. If user A is in this group of people, user A will be able to see user B's connection to user C, or in other words, the connection of user B to user C is visible from the perspective of user A.

In some instances, user A may be included in multiple groups of user B to which user B applies different privacy preferences. In some implementations, if user B establishes his connection to user C to be visible to at least one of the multiple groups, user A will be able to see user B's connection to user C. In this example, user A is subjected to the least restrictive privacy policy that user B establishes for the multiple groups. Alternatively, user A may be subjected to the most restrictive privacy policy that user B establishes for the multiple groups. For example, if user A is included in at least one of the multiple groups to which user B establishes his connection to user C to be non-visible to, user A will not be able to see user B's connection to user C, or in other words, the connection of user B to user C is not visible from the perspective of user A.

The PIC identifying component 504 determines a set of people in common between user A and user C from the perspective of the user A. The set of people in common as a result may be presented to user A only. Therefore, in determining people in common from the perspective of user A, user A's social network connections of any level of visibility restriction can be used without concern about violation of users' privacy.

In some implementations, the PIC identifying component 504 generates a truncated set of people in common, instead of a complete set of people in common between a first user and a second user from the perspective of the first user. The PIC identifying component 504 may also determine a total number of people in common between the first user and the second user. In some instances, the total number of people in common and the truncated set are provided to the first user upon receiving the request for people in common from the perspective of the first user. The truncated set of people in common may include no more than a maximum size of people in common. In some implementations, the maximum size of the truncated set is predetermined. For example, the maximum size of the truncated set may be established at ten. If there are more than ten people in common between the first user and the second user from the perspective of the first user, only ten people in common may be included in the truncated set and delivered to the first user. If there are fewer than or equal to ten people in common between the first user and the second user in total, the PIC identifying component 504 determines all people in common, e.g. the complete set of people in common is generated and displayed to the first user.

In some implementations, the total number of people in common and the truncated set are determined upon receiving a request for people in common from the perspective of the first user. In some implementations, the PIC identifying component 504 determines the total number of people in common and the truncated set prior to receiving a request for people in common from the perspective of the first user. The total number of people in common and the truncated set are stored, for example in storage device 441, and ready to be delivered to the first user when the request is received. In some instances, the PIC identifying component 504 updates the total number of people in common and the truncated set at a predetermined interval, for example every six hours, so that changes in privacy status of social network connections, if exist, are reflected in PIC information being predetermined and stored.

In some instances, the first user may request to view all people in common. In response to such request, the PIC identifying component 504 generates a complete set of people in common between the first user and second user from the perspective of the first user, and presents the complete set to the first user. In general, users do not necessarily request to view all people in common. Therefore, determining a complete list of people in common at the request time, e.g. live computation, reduces the amount of pre-computation and storage size required, while predetermining and storing the total number of people in common and the truncated set reduce the amount of computation at the request time and in-service latency. Accordingly, the present disclosure is capable of balancing between storage cost and computation cost. In some instances, when the total number of people in common is smaller than or equal to the maximum size of the truncated set, the complete set of people in common is predetermined, stored and provided to the first user in response to the request for a set of people in common from the perspective of the first user.

In some implementations, the PIC identifying component 504 removes, from the set of people in common between the first user and the second user, people in common having a number of public followers exceeding a predetermined threshold. For example, the PIC identifying component 504 removes people in common having more than ten thousand public followers. The people in common being removed are likely to be celebrities, who may not be a common connection of great value in indicating possible relationships between the first user and the second user. Other examples of criteria to identify and eliminate celebrities from the set of people in common are possible. In some implementations, the PIC identifying component 504 excludes, from the set of people in common between the first user and the second user, social network pages representing entities instead of representing individuals. The social network pages being precluded may represent businesses, organizations, brands, pseudonyms, individual personas, etc.

As described above, in some implementations, the PIC identifying component 504 predetermines and instructs the storage device 441 to store the truncated set of people in common and the total count of people in common. In some examples, the truncated set and the total count of people in common are updated at a predetermined interval. Before providing the stored information of people in common to the first user upon receiving a PIC request, it may be desirable to perform an interaction limitation check because the privacy settings associated with social network connections involved may have changed since the most recent update. Performing an interaction limitation check is to avoid accidentally revealing connections that the involved social network users, e.g. the second user or the people in common, no longer want the first user to know about. In some implementations, the PIC identifying component 504 sends the total number of people in common and the truncated set of people in common to the interaction limitation checking component 506 to perform such interaction limitation check.

The interaction limitation checking component 506 can be software including routines for checking interaction limitation associated with social network connections involving a person in common. In some instances, the interaction limitation checking component 506 can be a set of instructions executable by the processor 514 to provide the functionality described below for checking interaction limitation associated with the social network connections. In some other instances, the interaction limitation checking component 506 can be stored in the memory 512 of the computing device 500 and can be accessible and executable by the processor 514. The interaction limitation checking component 506 may be adapted for cooperation and communication with the processor 514 and other components of the computing device 500 via the bus 540.

In some instances, the interaction limitation checking component 506 receives, from the PIC identifying component 504 or from the storage device 441, the total number of people in common and the truncated set of people in common between the first user (e.g., user A) and the second user (e.g., user C) from perspective of the first user. In some instances, the interaction limitation checking component 506 determines whether or not there is a predetermined interaction limitation associated with connections between each person in common (e.g., user B) in the truncated set and user A or user C. On a social network, when a user imposes a predetermined interaction limitation on another user, the imposed user is prevented from taking one or more predetermined interactions with the imposing user. For example, user C has recently blocked user B since the last update. In some implementations, user B is removed from groups of user C that user B appears in. User B may not be able to view or add comments to content (e.g. posts, for example, photos, video, articles, comments, etc.) published by user C. Moreover, user B may not mention user C in his post or comments being shared with other social network users.

In some instances, if user B has blocked user C or user C has blocked user B since the most recent update, user B is excluded from the truncated set of people in common between user A and user C. In some instances, if user B has blocked user A or user A has blocked user B since the most recent update, user B is also excluded from the truncated set of people in common between user A and user C. Examples of an interaction limitation may include, but are not limited to, permanently blocking, temporarily blocking, ignoring, adding to an unwelcome list or blacklist, etc.

In some implementations, if there is a predetermined interaction limitation associated with the connection between user B and user A or the connection between user B and user C, user B will not be provided to user A as person in common. The interaction limitation checking component 506 modifies the truncated set of people in common by removing user B from the truncated set. The interaction limitation checking component 506 accordingly updates the total number of people in common, for example, by reducing the total number of people in common by one. In some instances, after all people in common included in the truncated set may be subjected to the interaction limitation checking, the modified truncated set and the accordingly modified total number of people in common may be sent to the GUI component 510 to be presented to user A. Alternatively, the interaction limitation checking component 506 may send the modified truncated set to the ranking component 508 for further processing.

The ranking component 508 can be software including routines for ranking people in common based on a criterion. In some instances, the ranking component 508 can be a set of instructions executable by the processor 514 to provide the functionality described below for sorting people in common. In some other instances, the ranking component 508 can be stored in the memory 512 of the computing device 500 and can be accessible and executable by the processor 514. The ranking component 508 may be adapted for cooperation and communication with the processor 514 and other components of the computing device 500 via the bus 540.

In some implementations, any set of people in common can be arranged by the ranking component 508, for example, before being delivered to the first user or before being stored in the storage device 411. In some instances, the ranking component 508 may rank the complete set of people in common being received from the PIC identifying component 504. In some instances, the ranking component may rank the modified truncated set of people in common being received from the interaction limitation checking component 506. In some implementations, the ranking component 508 ranks people in common based at least in part on the affinities with the first user, e.g. the requestor to which the set of people in common is presented. Affinity with the first user may be data describing a degree of closeness between a person in common and the first user.

In some instances, the set of people in common may be reorganized in descending order by affinity, e.g. one or more people in common having closer affinity with the first user are placed at higher positions in the ranked set of people in common. For example, an affinity score may be determined to be higher, and thus a closer affinity, when the relationship includes reciprocal connections (e.g., a person in common follows the first user and the first user follows the person in common) than when the relationship is one-sided. In some instances, the closer the relationship, the closer the affinity. For example, a first-degree relationship between the first user and a first person in common is a closer relationship, and thus a closer affinity, than a second-degree relationship between the first user and a second person in common. For example, a user X follows a user Y, user Y follows user Z that user X does not follow. User X has a first-degree relationship with user Y and a second-degree relationship with user Z. User X therefore has a closer affinity, and thus higher affinity score, with user Y than user Z. Alternatively, a lower affinity score may indicate a closer relationship or the set of people in common may be arranged in ascending order. In some implementations, the set of people in common may be sorted based at least in part on frequency or recency of people in common's interaction with the first user. For example, one or more people in common that interact with the first user more frequently or more recently will be assigned higher positions in the ranked set of people in common. Other ranking criteria to rank people in common are possible.

In some implementations, the truncated set of people in common may be determined from an intermediate set of people in common. The intermediate set includes more than a maximum size of people in common. For example, the maximum size of the truncated set is established at fifteen. The PIC identifying component 504 determines an intermediate set of, for example, thirty people in common and instructs the ranking component 508 to rank the intermediate set. The ranking component 508 ranks the intermediate set according to affinity score or other ranking standard. In some instances, the top fifteen people having the highest affinity score in the intermediate set are selected to form a truncated set of people in common. Alternatively, the last fifteen people in the intermediate set may be selected, depending on the type of ranking order being used.

The GUI component 510 can be software including routines for generating graphical data for providing user interfaces to users. In some instances, the GUI component 510 can be a set of instructions executable by the processor 514 to provide the functionality described below for generating graphical data for providing user interfaces. In some other instances, the GUI component 510 can be stored in the memory 512 of the computing device 500 and can be accessible and executable by the processor 514. The GUI component 510 may be adapted for cooperation and communication with the processor 514 and other components of the computing device 500 via the bus 540.

In some instances, the GUI component 510 receives, from the PIC identifying component 504 or from the ranking component 508, a complete set of people in common between the first user and the second user from the perspective of the first user. In some instances, the GUI component 510 receives, from the interaction limitation checking component 506 or from the ranking component 508 or from the storage device 411, a truncated set of people in common between the first user and the second user from the perspective of the first user. In some instances, the GUI component 510 also receives the total number of people in common between the first user and the second user from the perspective of the first user.

In some implementations, the GUI component 510 generates graphical data for presenting people in common to the first user. Examples of the graphical user interface are shown in FIGS. 6 and 7.

Figure 6:
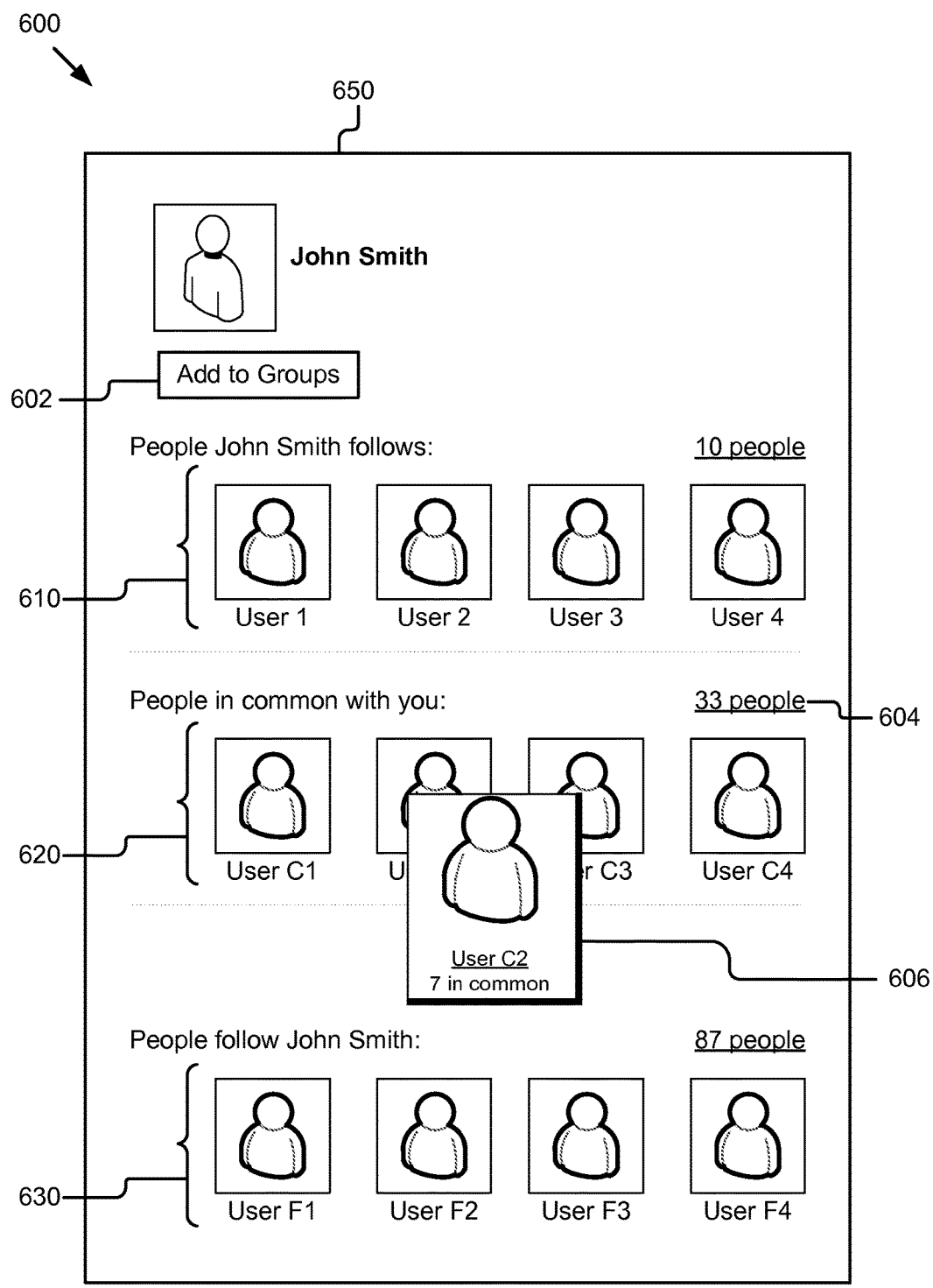
FIG. 6 is a graphic representation of an example user interface for providing the first user with people in common between the first user and the second user on a profile page of the second user.
Figure 7:
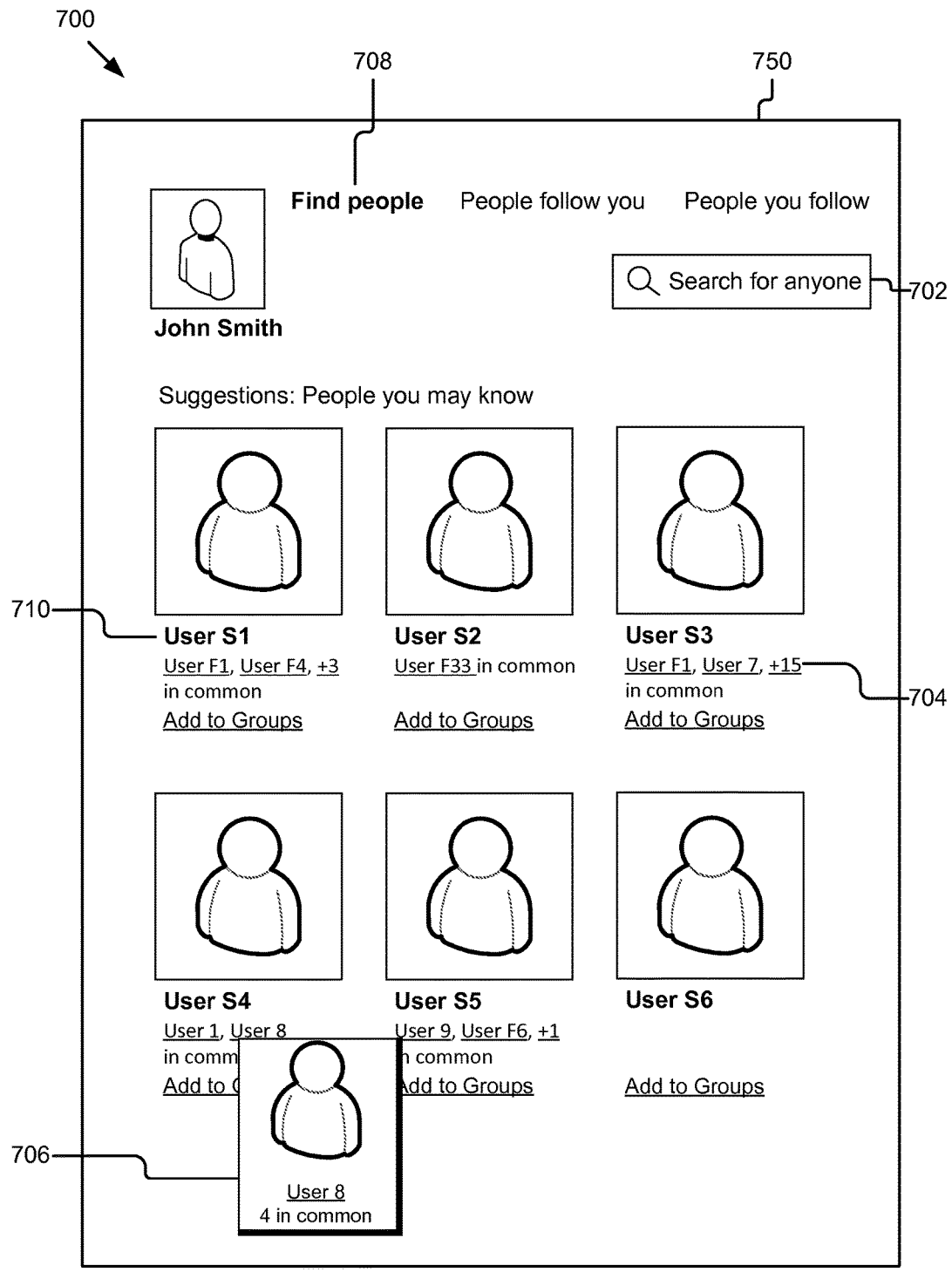
FIG. 7 is a graphic representation of an example user interface for providing the first user with people in common between the first user and suggested connections on a "Find people" page of the first user.

FIG. 6 is a graphic representation 600 of an example user interface 650 for presenting people list of user John Smith to the viewer who is seeing John Smith's profile page. In this illustrated implementation, the viewer is considered the first user. John Smith is the profile owner and is considered the second user. The user interface 650 includes a set of people that John Smith follows 610, a set of people following John Smith (e.g. John Smith's followers) 630, and a set of people in common 620 between the first user and John Smith. Each set of people may include one or more social network users and a total number indicator 604 indicating the total number of users in the set. In some instances, if a set of people contains no user, the set of people will be removed from the people list. For example, John Smith is a new user who recently joined the social network, and has not yet had any followers. The set of people following John Smith 630 includes zero users and is removed from the user interface 650. In some implementations, the user interface 650 includes an "Add to group" button 602 for the first user to connect with John Smith if he wants to establish such connection. For example, the viewer may connect to user John Smith by clicking on the "Add to group" button 602.

The set of people in common 620 is a truncated set including a maximum size of people in common. The maximum size is smaller than the total number of people in common. For example, the maximum size may be four people in common as illustrated in FIG. 6. According to the total number indicator 604, the first user (e.g., the viewer) and the second user (e.g., John Smith) have in total thirty three people in common, only four of them are presented to the first user. A truncated set of four people in common including four users C1-C4 is provided to the first user on the user interface 650 as the set of people in common 620. Users C1-C4 may be ranked in descending order by affinity with the first user, e.g. user C1 has the closest affinity with the first user among those four people in common. In the illustrated implementation, the first user may request to view all people in common between himself and John Smith, for example, by clicking on the total number indicator 604. In response to such request, the PIC identifying component 204 generates a complete set of people in common and provides the complete set including thirty three people in common to the first user, for example, on a popup window (not shown).

In some instances, if the total number of people in common between the first user and the second user is fewer than or equal to the maximum size of truncated set, the complete set of people in common, instead of a truncated set, will be determined and presented to the first user. For example, the first user and John Smith only have two people in common. A complete set of people in common including the two people in common is generated and displayed as the set of people in common 620 on the user interface 650. In this example, the first user may click on the total number indicator 604, which indicates there are a total of two people in common, to see the complete set of people in common on a separate popup window (not shown) if he wishes. In some instances, there may be no people in common between the first user and the profile owner John Smith. The set of people in common 620 includes zero users and is removed from the user interface 650 as described above.

In some implementations, the first user may quickly determine the closeness of his relationship with a person in the people list of John Smith, for instance, by moving a pointer over an object representing the person that he is interested in. As an example, the first user wants to view user C2 in the set of people in common 620 in further detailed. A total count of people in common and/or a truncated set of people in common between the first user and user C2 may show up, for example, on a popup component 606 as shown in FIG. 6. In this situation, for purpose of determining people in common, the viewer remains being considered as the first user, while the second user is changed from the profile owner John Smith to the selected person, e.g. user C2. In some instances, only the total number of people in common between the first user and user C2 may be displayed to the first user on the popup component 606. In some instances, the popup component 606 may include a link to the social network profile of the selected person to facilitate the first user's visit. For example, first user may click on the username "User C2" on the popup component 606 to be redirected to user C2's home page. In this example, user C2 is a person in common between the first user and John Smith, and appears in the set of people in common 620 on John Smith's profile page. In some instances, user C2 may be a user in the set of people that John Smith follows 610 or a user in the set of people following John Smith 630.

FIG. 7 is a graphic representation 700 of an example user interface 750 for providing a "Find people" feature to a profile owner. In this implementation, the user interface 750 illustrates a "Find people" tab 708 on John Smith's profile page. In some implementations, the user interface 750 includes a search box 702 for searching people using keywords. In some examples, social network users can search people by name, username, email address, city, company, school, etc. Those terms can be inputted into the search box 702 as keywords.

In some implementations, the user interface 750 includes one or more suggested connections 710. The one or more suggested connections 710 include recommended people that John Smith may know or may want to connect with. In this illustrated implementation, John Smith is the profile owner and is considered the first user. Each suggested user may be considered as a second user. For each suggested connection 710, the PIC identifying component 204 may generate a truncated set of people in common between the first user (e.g., John Smith) and the second user (e.g., the suggested user) from the perspective of the first user. The truncated set includes a maximum size of people in common. For example, the maximum size may be two people in common as illustrated in FIG. 7.

In this illustrated implementation, each suggested connection 710 may be presented to the first user John Smith with the truncated set including two people in common together with the additional people indicator 704. In some implementations, the additional people indicator 704 indicates the number of people in common between the first user and the second user in addition to the people in common in the truncated set. For example, user S3 is suggested to the first user John Smith with a truncated set including two people in common, e.g. user F1 and user 7. The additional people indicator 704 indicates that there are fifteen more people in common between John Smith and user S3, e.g. John Smith and user S3 have a sum of seventeen people in common. In the illustrated implementation, the first user may request to view all people in common between himself and the suggested user S3, for example, by clicking on the additional people indicator 704. In response to such request, the PIC identifying component 204 generates a complete set of people in common and provides the complete set including seventeen people in common between the first user and user S3 to the first user, for example, on a popup window (not shown).

In some instances, the truncated set including users F1 and user 7 may be ranked in descending order by affinity with the first user, e.g. user F1 has a closer affinity with the first user than user 7.

In some instances, if the total number of people in common between the first user and the second user is smaller than or equal to the maximum size of truncated set, the complete set of people in common, instead of a truncated set, will be determined and presented to the first user. For example, the first user John Smith and user S2 only have one person in common. A complete set of people in common including the one person in common, e.g. user F33, is determined and displayed to the first user. In this example, the additional people indicator 704 may be removed from the suggested connection 710 because there are no additional people in common. In some instances, there may be no people in common between the first user and the suggested user, for example user S6. The truncated set of people in common between John Smith and user S6 includes zero users and is removed from the suggested connection 710. In some instances, the suggested connection 710 may include an "Add to group" button for the first user to connect with the suggested user if he decides to establish such connection.

In some implementations, the first user may quickly determine the closeness of his relationship with a person in a truncated set of people in common, for instance, by moving a pointer over an object representing the person that he is interested in. As an example, John Smith wants to view user 8 in the truncated set of people in common between himself and user S4 in further detailed. A total count of people in common and/or a truncated set of people in common between the first user and user 8 may show up, for example, on a popup component 706 as shown in FIG. 7. In this situation, for purpose of determining people in common, the viewer (e.g. the profile owner John Smith) remains being considered as the first user, while the second user is changed from the suggested user (e.g., user 4) to the selected person (e.g., user 8). In some instances, only the total number of people in common between the first user and user 8 may be displayed on the popup component 706. In some instances, the popup component 706 may include a link to the social network profile of the selected person to facilitate the first user's visit. For example, first user may click on a username "User 8" on the popup component 706 to be redirected to user 8's home page.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In the above description, for purposes of explanation, numerous specific details are set forth in order to provide a thorough understanding of the specification. It will be apparent, however, that the technology can be practiced without these specific details. In other instances, structures and devices are shown in block diagram form in order to avoid obscuring the description. For example, the present implementation is described in one implementation below primarily with reference to user interfaces and particular hardware. However, the specification applies to any type of computing device that can receive data and commands, and any peripheral devices providing services.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In some implementations, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the components, modules, routines, features, attributes, methodologies and other aspects are not mandatory or significant, and the mechanisms that implement the specification or its features may have different names, divisions and/or formats. Furthermore, as will be apparent the components, modules, routines, features, attributes, methodologies and other aspects of the disclosure can be implemented as software, hardware, firmware or any combination of the three. Also, wherever a component of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the specification, which is set forth in the following claims.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A computer-implemented method comprising:
  determining one or more connections of a first user, a second user, and a third user from a social networking service, a connection including a direction and a security permission, wherein the direction between two users defines information of each user visible by another user;
  determining an intersection between the first user's social graph and the second user's social graph in the social networking service;
  identifying that the third user connects to both the first user and the second user based on the intersection;
  determining, from a perspective of the first user, that the third user is a person in common between the first user and the second user based on a first direction of a first restricted connection, and a first security permission controlling visibility of the first restricted connection between the second user and the third user to members of a first group and the first user being a member of the first group;
  determining, from a perspective of the second user, that the third user is not a person in common between the first user and the second user based on a second direction of a second restricted connection, and a second security permission controlling visibility of the second restricted connection between the first user and the third user to members of a second group and the second user failing to be a member of the second group;
  determining different sets of people in common between the first user and the second user from different perspectives of the first user and the second user using the first and second restricted connections, and the first and second security permissions, wherein a set of people in common determined from the perspective of the first user includes the third user;
  predetermining, from the perspective of the first user, a truncated set of people in common between the first user and the second user based on the set of people in common; and
  subsequent to predetermining the truncated set of people in common between the first user and the second user:

automatically generating a request for people in common between the first user and the second user from the perspective of the first user in response to detecting an interaction of the first user on the social networking service that is related to the second user;

in response to automatically generating the request for people in common between the first user and the second user, determining whether the first security permission has changed since the truncated set of people in common was predetermined, the first security permission being related to the third user;

in response to determining that the first security permission has changed, removing the third user from the truncated set of people in common; and providing the first user with the truncated set of people in common between the first user and the second user from the perspective of the first user, wherein the truncated set of people in common is updated at a predetermined interval.

2. The method of claim 1, wherein predetermining the truncated set of people in common is based on a predetermined threshold number.

3. The method of claim 1, wherein a third connection between at least one person in the set of people in common and the second user is a publicly visible connection of the at least one person in the set of people in common.

4. The method of claim 1, further comprising:
determining a total number of people in common.

5. The method of claim 4, wherein the truncated set of people in common is predetermined based on user affinity with the first user.

6. The method of claim 4, wherein the total number of people in common is updated at a predetermined interval.

7. The method of claim 4, wherein the truncated set of people in common is sorted based on a criterion.

8. The method of claim 7, wherein the truncated set of people in common is sorted based on affinities with the first user.

9. The method of claim 1, further comprising removing, from the set of people in common, one or more people in common having a number of public followers exceeding a predetermined threshold.

10. A system comprising:
one or more processors; and
a memory storing instructions that, when executed, cause the system to:
determine one or more connections of a first user, a second user, and a third user from a social networking service, a connection including a direction and a security permission, wherein the direction between two users defines information of each user visible by another user;
determine an intersection between the first user's social graph and the second user's social graph in the social networking service;
identify that the third user connects to both the first user and the second user based on the intersection;
determine, from a perspective of the first user, that the third user is a person in common between the first user and the second user based on a first direction of a first restricted connection, and a first security permission controlling visibility of the first restricted connection between the second user and the third user to members of a first group and the first user being a member of the first group;
determine, from a perspective of the second user, that the third user is not a person in common between the first user and the second user based on a second direction of a second restricted connection, and a second security permission controlling visibility of the second restricted connection between the first user and the third user to members of a second group and the second user failing to be a member of the second group;
determine different sets of people in common between the first user and the second user from different perspectives of the first user and the second user using the first and second restricted connections, and the first and second security permissions, wherein a set of people in common determined from the perspective of the first user includes the third user;
predetermine, from the perspective of the first user, a truncated set of people in common between the first user and the second user based on the set of people in common; and
subsequent to predetermining the truncated set of people in common between the first user and the second user:
automatically generate a request for people in common between the first user and the second user from the perspective of the first user in response to detecting an interaction of the first user on the social networking service that is related to the second user;
in response to automatically generating the request for people in common between the first user and the second user, determine whether the first security permission has changed since the truncated set of people in common was predetermined, the first security permission being related to the third user;
in response to determining that the first security permission has changed, remove the third user from the truncated set of people in common; and
provide the first user with the truncated set of people in common between the first user and the second user from the perspective of the first user, wherein the truncated set of people in common is updated at a predetermined interval.

11. The system of claim 10, wherein predetermining the truncated set of people in common is based on a predetermined threshold number.

12. The system of claim 10, wherein a third connection between at least one person in the set of people in common and the second user is a publicly visible connection of the at least one person in the set of people in common.

13. The system of claim 10, wherein the memory further stores instructions that, when executed, cause the system to:
determine a total number of people in common.

14. The system of claim 13, wherein the truncated set of people in common is predetermined based on user affinity with the first user.

15. The system of claim 13, wherein the total number of people in common is updated at a predetermined interval.

16. The system of claim 13, wherein the truncated set of people in common is sorted based on a criterion.

17. The system of claim 16, wherein the truncated set of people in common is sorted based on affinities with the first user.

18. A computer program product comprising a non-transitory computer usable medium including a computer readable program, wherein the computer readable program when executed on a computer causes the computer to:
determine one or more connections of a first user, a second user, and a third user from a social networking service, a connection including a direction and a security permission, wherein the direction between two users defines information of each user visible by another user;
determine an intersection between the first user's social graph and the second user's social graph in the social networking service;
identify that the third user connects to both the first user and the second user based on the intersection;
determine, from a perspective of the first user, that the third user is a person in common between the first user and the second user based on a first direction of a first restricted connection, and a first security permission controlling visibility of the first restricted connection between the second user and the third user to members of a first group and the first user being a member of the first group;
determine, from a perspective of the second user, that the third user is not a person in common between the first user and the second user based on a second direction of a second restricted connection, and a second security permission controlling visibility of the second restricted connection between the first user and the third user to members of a second group and the second user failing to be a member of the second group;
determine different sets of people in common between the first user and the second user from different perspectives of the first user and the second user using the first and second restricted connections, and the first and second security permissions, wherein a set of people in common determined from the perspective of the first user includes the third user;
predetermine, from the perspective of the first user, a truncated set of people in common between the first user and the second user based on the set of people in common; and
subsequent to predetermining the truncated set of people in common between the first user and the second user:
automatically generate a request for people in common between the first user and the second user from the perspective of the first user in response to detecting an interaction of the first user on the social networking service that is related to the second user;
in response to automatically generating the request for people in common between the first user and the second user, determine whether the first security permission has changed since the truncated set of people in common was predetermined, the first security permission being related to the third user;
in response to determining that the first security permission has changed, remove the third user from the truncated set of people in common; and
provide the first user with the truncated set of people in common between the first user and the second user from the perspective of the first user, wherein the truncated set of people in common is updated at a predetermined interval.

* * * * *

UNITED STATES PATENT AND TRADEMARK OFFICE
CERTIFICATE OF CORRECTION

| | | |
|---|---|---|
| PATENT NO. | : 10,339,189 B2 | Page 1 of 1 |
| APPLICATION NO. | : 14/834327 | |
| DATED | : July 2, 2019 | |
| INVENTOR(S) | : Bapat | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 29 days.

Signed and Sealed this
Thirty-first Day of December, 2019

Andrei Iancu
*Director of the United States Patent and Trademark Office*